United States Patent [19]

van Bergen

[11] 4,014,075
[45] Mar. 29, 1977

[54] LIBERATING MEAT FROM SLAUGHTERED ANIMALS, AND A PRESS FOR SEPARATING MEAT FROM BONES

[75] Inventor: Theodorus M. van Bergen, Oss, Netherlands

[73] Assignee: Protecon B.V., Netherlands

[22] Filed: Jan. 17, 1975

[21] Appl. No.: 541,849

[30] Foreign Application Priority Data

Apr. 24, 1974 Netherlands ............... 7405531
Aug. 30, 1974 Netherlands ............... 7411576

[52] U.S. Cl. ............................................. 17/1 G
[51] Int. Cl.² ................................... A22C 17/04
[58] Field of Search .............. 17/1 G, 46, 56, 1 R, 17/32; 99/537, 538, 565; 241/83, 84, 68, 69, 95, 4

[56] References Cited

UNITED STATES PATENTS

| 254,812 | 3/1982 | Gathmann | 99/537 |
|---|---|---|---|
| 3,471,299 | 10/1969 | Duckworth et al. | 17/1 G |
| 3,741,772 | 6/1973 | McFarland | 17/46 |
| 3,813,731 | 6/1974 | Becker et al. | 17/32 |
| 3,841,569 | 10/1974 | Engelhardt et al. | 17/46 |
| 3,909,881 | 10/1975 | Anderson | 17/32 |

FOREIGN PATENTS OR APPLICATIONS

| 1,066,902 | 5/1958 | Germany | 17/1 G |
| 138,830 | 9/1960 | U.S.S.R. | 17/1 G |

Primary Examiner—Louis G. Mancene
Assistant Examiner—James D. Hamilton
Attorney, Agent, or Firm—Bucknam and Archer

[57] ABSTRACT

A press for separating flesh from bones in which a charge of bones with flesh attached is received in a chamber and a plunger moveable axially in the chamber compresses the bones and flesh to liberate from the bones flesh in the form of a paste which flows through restricted size passages to exit the chamber. Bones retained in the chamber during compression are discharged thereafer through a passage in a cover on the chamber which passage is selectively opened and closed by a valve associated with a cover.

5 Claims, 3 Drawing Figures

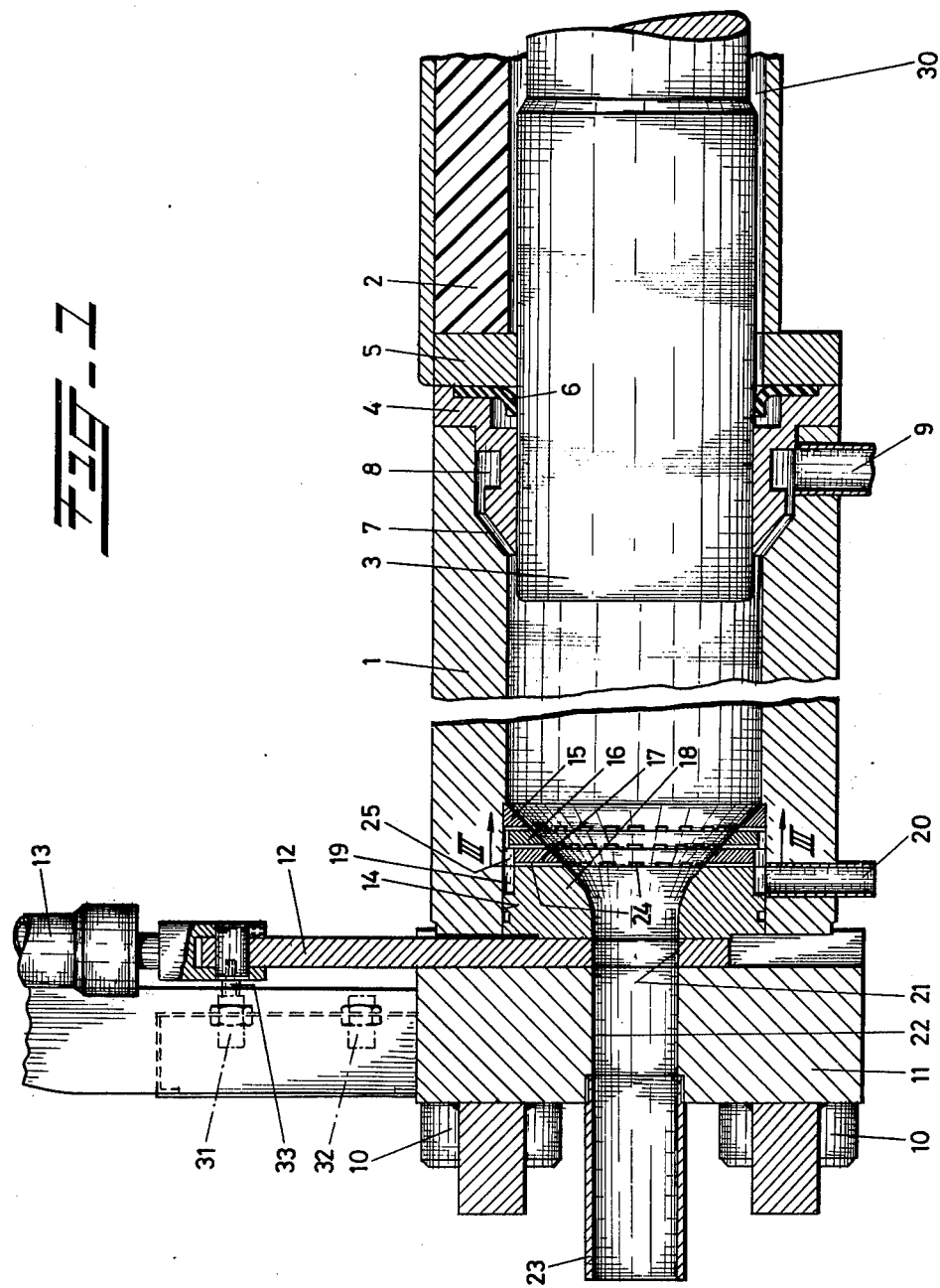

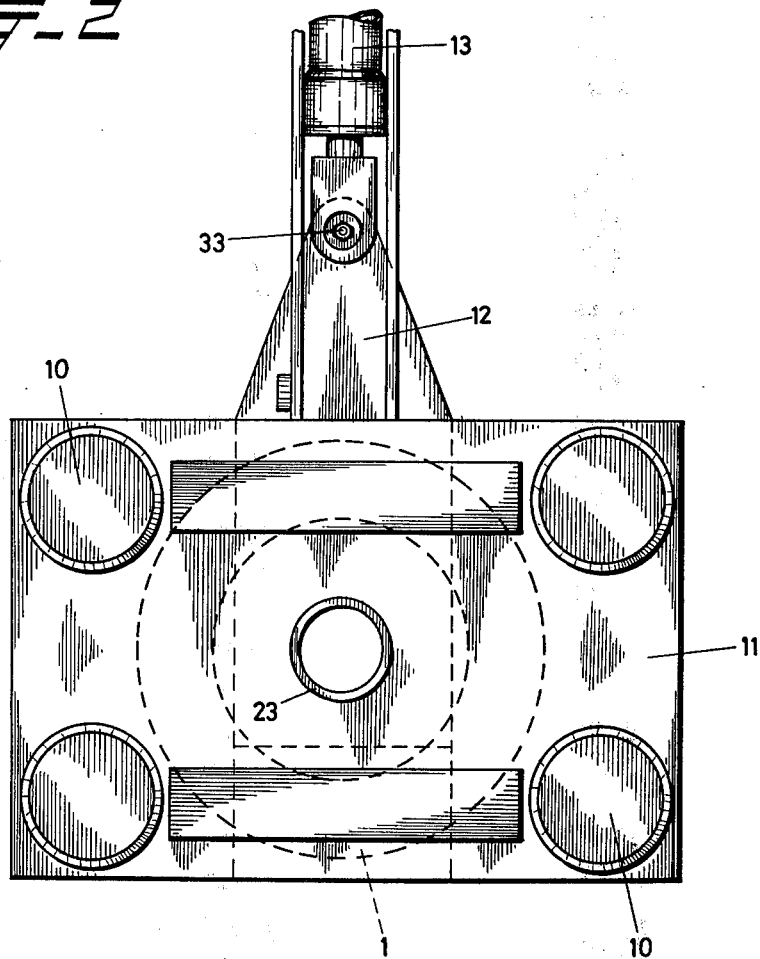
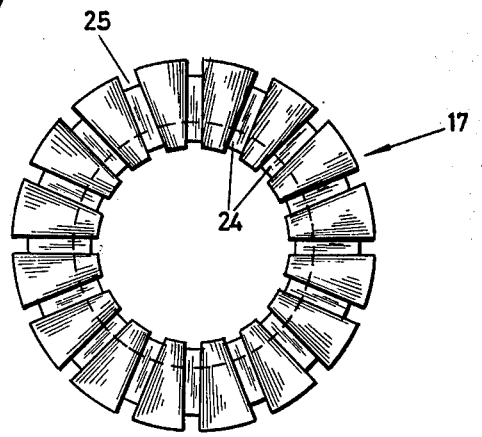

LIBERATING MEAT FROM SLAUGHTERED ANIMALS, AND A PRESS FOR SEPARATING MEAT FROM BONES

BACKGROUND OF THE INVENTION

This invention relates to a method for liberating meat from slaughtered animals, and to a press for separating meat from bones.

It is known, in particular for larger animals such as cattle including cows and hogs, to cut large pieces of meat with bones therefrom, to debone said pieces by hand or by machines and to use the meat for human consumption, after suitable treatment of the meat such as salting, curing, cooling, boiling, making hams therefrom etc. The remaining bones may be used for suitable purposes, such as for making gelatinous substances, e.g., glue or gelatine. For such purposes the bones have to be cleaned, which may be done by scraping, by jets of water or other substances, by washing etc., to remove remnants of meat, sinews and the like.

For cheaper types of meat and for smaller animals with a relatively large amount of small bones it is known to separate the meat from the bones by bringing the animals such as poultry as a whole or in pieces in a press having small perforations in one or more walls. Pressing is obtained by a moving plunger or piston or by a rotating worm screw, and thereby the meat is transferred into a paste-like mass, which is thus loosened from the bones and pressed outwards through the perforations, which keep the bones back in the press. During pressing the bones may be fragmented somewhat, or they may be fragmented considerably, e.g., by cutting edges of a worm screw.

In another proposal, which was only published after the filing date of my first application in Holland, trimmed bones or bony carcass portions are first broken or reduced in size and are thereupon treated in a press to extrude the meat in fluidized or paste-like form through perforations in a wall of the press, while keeping back the bone fragments in the press cylinder.

SUMMARY OF THE INVENTION

The present invention aims at an improvement of known methods and devices for removing meat from bones. To this end, a method for liberating meat from slaughtered animals according to the invention comprises the steps of dividing the animal into pieces including pieces containing both meat and bone, deboning at least part of said pieces to liberate a considerable quantity of the meat from the bones, bringing at least a considerable part of the bones thus obtained, without being fragmented, into a space with a movable wall and narrow perforations in the wall of said space leading to the outside, and moving the movable wall into the space to put the bones with meat remnants attached thereto under pressure until a considerable part of said meat is made into a paste-like substance which under influence of said pressure flows out of said space through said perforations, which do not allow said bones to pass therethrough. The improved press for separating meat from bones of slaughtered animals according to this invention comprises a space having a movable wall, narrow perforations for allowing paste-like meat to leave said space, and a large discharge opening in the wall of the space opposite said movable wall, with a closing member for closing and opening of said discharge opening to allow removal of the pressed bones from said space through said discharge opening upon further movement of said movable wall after finishing the movement for putting said bones under pressure with closed closing member.

This invention will now be explained in more detail with reference to the attached drawings, giving by way of preferred example only parts of a press according to the invention, with which the method of the invention may be realized to advantage.

DESCRIPTION OF THE DRAWINGS

FIG. 1 is a vertical axial section through the most essential parts of such a press;

FIG. 2 is a view of this press from the left in FIG. 1; and

FIG. 3 is a view of an annular body in said press as seen along the plane between the arrows III-III and in the direction of these arrows in FIG. 1.

DESCRIPTION OF A PREFERRED EMBODIMENT OF THE INVENTION

A press cylinder 1 has a horizontal axis, but it may also have another position such as a vertical one. This cylinder is in communication with a filling space 30 provided with a cover 2. The right hand end of this space and of this cover have not been shown. A plunger 3 is driven so as to move in a direction from left to right and from right to left as seen in FIG. 1 by means not shown, such as a pneumatic or hydraulic cylinder positioned at the right hand end of said plunger. This plunger 3 is thus adapted to move into and out of the press cylinder 1. Between said cylinder 1 and plunger 3 a small peripheral space is left and the plunger 3 passes as a sliding fit through an annular body 4 at the right hand end of the press cylinder. An end ring 5 of the filling space is bolted to cylinder 1 and an elastic sealing ring 6 is clamped between parts 4 and 5 to seal against the outer periphery of plunger 3. A peripheral discharge slot 7 between a conical end part of ring 4 and press cylinder 1 and divided into separate openings made as grooves in body 4 gives communication to an annular discharge space 8 connected to a discharge pipe 9. Meat which is pressed out and which is made into a paste-like condition by the pressing is thus adapted to flow out through slot 7 and space 8 and through pipe 9.

At the opposite end of the press cylinder 1 this is connected by bolts 10 engaging into a flange not shown on the cylinder to a heavy cover plate 11. Between cover plate 11 and press cylinder 1 there is a slide valve 12 being guided between edges of a recess in cover 11 and having some axial clearance, as seen in the direction of the axis of the press cylinder being the horizontal line in FIG. 1, between said cylinder 1 and cover 11. A hydraulic or pneumatic cylinder 13 shown only in part in FIGS. 1 and 2 is adapted to move this slide valve 12 up and down between an open and a closed position, determined by micro switches 31 and 32 (FIG. 1) in the stationary structure, operated by a protrusion 33 moving with the slide valve 12.

In press cylinder 1 near slide valve 12 there is an internal bore 14 having a somewhat larger diameter than the remainder of the interior of said cylinder. In said bore 14 four annular bodies or rings 15, 16, 17 and 18 are provided making a sliding fit in said bore 14 so as to be guided adequately thereby but to be axially movable therein. Each two adjacent rings thereof are in contact with each other in a plane perpendicular to the axis of the cylinder, but each time one of said planes of contact is in one of the rings interrupted to form passages for allowing paste-like meat to flow radially outwardly between two adjacent rings so as to flow towards a collecting space 19 which is in communication with a discharge pipe 20. Said annular bodies internally have a central opening, which is purely conical for bodies 15, 16 and 17 and which in annular body 18 is first conical and then rounded to merge into a cylindrical opening where body 14 is in contact with slide valve 12. Thus the annular bodies together form a smooth surface, being converging from the right end of annular body 15 to the left in FIG. 1 as shown. Slide valve 12 has a discharge opening 21 exactly of the same diameter as the cylindrical part of the opening within ring 18. In cover 11 there is a central opening 22 of the same diameter and this gives communication to a discharge duct 23 of the same inner diameter.

It appears from FIG. 3 that the annular body 17 in its left end face, as seen in FIG. 1, has radial grooves 24 and, at its outer periphery, has axially throughgoing recesses 25 in communication with said grooves 24. The annular bodies 15 and 16 have grooves similar to grooves 24 in their left end face as seen in FIG. 1. Ring 15 has an uninterrupted cylindrical outer surface making a sliding fit in bore 14. Ring 16 has the same type of axially throughgoing recesses as recesses 25 in ring 17, but of slighter radial depth, as shown in FIG. 1.

The method according to the invention will now be described in more detail. Slaughtered animals are cut to pieces including pieces containing both meat and bone, as is usual e.g., for cattle, hogs, and the like. Part of said pieces are thereupon deboned or trimmed, which may be done by hand, but for which also machines, automatic or hand-operated, are available as is known to the expert. Thus a considerable quantity of the meat from the bones is liberated and may be used for consumption after a suitable further treatment of any desired kind. The bones obtained by the deboning or trimming still have some meat attached thereto and they are now, without being fragmented any further, put into the filling space 30 of the press with retracted position of plunger 3 (fully to the right in FIG. 1) and with opened cover 2. This filling of the press may be done by hand or automatically from some suitable filling device such as a hopper opening above said filling space and in some cases the cover 2 may be omitted.

After filling said filling space and closing cover 2, plunger 3 is now moved to the left in FIG. 1 while the slide valve 12 is in the closed (downward) position. The bones with meat remnants attached thereto are thus moved into cylinder 1 and put under pressure therein by the plunger 3 and they are thus compacted, and at a certain pressure the meat attached to the bones is transformed into a paste-like substance, which under infuence of said pressure flows out in part through the slot 7 into space 8 and out through pipe 9 and in part radially outwardly through the recesses 24 and similar recesses in rings 15 and 16 to the collecting space 19 and thus out through duct 20. I have the impression that already at pressures below 10 atmospheres the meat to a considerable extent is transferred into a paste-like condition, but such a pressure is too low to obtain a considerable outflow of such meat from the press space. It will be easy for the expert to determine the desired pressure depending on conditions and e.g., upon the question whether some fracturing of the bones in the press is allowable, whether it is desired to press part of the marrow from the bones and, in connection therewith, what size is chosen for the discharge openings.

After either the desired pressure is reached or after the plunger 3 has moved into the press space 1 over a desired distance, the slide valve 12 is opened.

Whether a certain position of plunger 3 or a certain pressure in the press cylinder 1 is chosen to determine the moment of opening slide valve 12 may depend on the question whether the volume of bones fed to the cylinder is always exactly the same or not. If this quantity may differ considerably, it is better to open slide valve 12 at a certain pressure in the press, which may occur at different positions of plunger 3. This pressure may be determined by a suitable manometer or the like measuring the pressure either in the press cylinder or in the cylinder for driving the plunger.

Upon further movement of plunger 3 upon opening of slide valve 12 the bones in the press space are pressed into discharge pipe 23 by moving through the conical converging space within the rings 15, 16, 17 and 18 and through the slide valve 12. Thereupon plunger 3 is retracted to the right in FIG. 1 to allow a new quantity of bones with meat to be fed to the press space from filling space 30. Slide valve 12 is then moved downwardly to the closed position. In doing this there may be some bone parts within the opening 21 of the slide valve, but they will easily be pushed out of said opening or broken to have parts remaining therein when the slide valve moves to the closed position.

It has appeared to be favorable that plunger 3 does not make a sliding fit in the press cylinder 1 so that part of the meat made into a paste is also adapted to flow backwardly with respect to the plunger to slot 7, space 8 and pipe 9. Moreover it is an interesting aspect that the rings 15 to 18 are slightly slidable in the bore 14. In this way the pressure in the cylinder presses them onto the slide valve 12 which is pressed thereby into contact with cover plate 11, so that the press space is adequately closed. In some cases, this may mean that the slide valve 12 is clamped with a considerable force between ring 18 and cover 11 and this could make it necessary to apply a considerable force to move the slide valve 12 to the opening position. If this would be the case, it is possible to stop the plunger 3 just before the slide valve 12 has to be opened and in doing this the pressure in the cylinder 1 will decrease by further meat flowing out, and thereupon the pressure by which ring 18 is pushed onto slide valve 12 decreases. If this decrease of pressure within a few seconds is not sufficient, plunger 3 may even be retracted to the right somewhat when slide valve 12 has to be opened.

At the left outer end of ring 18 FIG. 1 shows a peripheral recess, in which a sealing ring such as an O-ring may be introduced.

The paste-like meat pressed from the press will be suited for many purposes such as for making sausages. It has appeared that in many cases it is preferable to pass this meat through a sieve surface and, if there is the risk that small bone parts are present in the meat e.g., for brittle bones and/or very high pressures in the press, it may be preferable to pass the meat through a suitable colloid mill to grind harder parts to a sufficiently small dimension. By any suitable combination of such possibilities it is possible to remove also parts of sinews, gristles and the like from the meat paste.

Several experiments have been made to test the method and apparatus according to the invention. In these experiments shoulder bones (humerus), buttock bones (femur), tail bones, ribs, breast bones and leg (shank) bones of cows and hogs were treated in accordance with this invention. Most of such bones obtained after deboning gave a quantity of meat leaving the press at pressures up to 280 to 300 atmospheres of 17 to 28% by weight of the total weight introduced into the press for the shoulder, buttock and shank bones, 28 to 45% for the tail bones, 30 to 40% for the breast bones and 40 to 50% for the ribs. In all cases the paste-like meat extruded from the press appeared to contain between 50 and 65% by weight of water, between 11 and 17% of proteins, between 19 and 33% of fat, from 1.5 to 1.7% of ashes and between 0.45 and 0.59% of $P_2O_5$. The composition thereof did not vary much with differing pressures in the press. The total quantity of bones with meat pressed each time in each experiment was of a weight of between 15 and 54 kg. Each experiment was repeated several times for the same type of bones and the above percentages are average values from such a series of experiments. Good results may also be obtained with lower pressures, e.g., between 50 to 100 atmospheres.

I claim:

1. A press for separating flesh from bones which comprises a chamber for receiving a charge of bones with flesh attached; a plunger moveable axially in said chamber to compress the bones and flesh therein and thereby liberate from the bones flesh in the form of a paste; means in said chamber defining restricted size passages allowing the exit from the chamber of said flesh paste and retaining in the chamber the bones; cover means connected to said chamber to define a passage for the discharge of compressed bones from the chamber; and valve means associated with said cover means and operable to selectively open and close said passage to allow discharge of the bones therefrom when open, and to seal the passage and thereby retain the bones in the chamber when closed.

2. A press according to claim 1 wherein the means in said chamber defining said restricted size passages includes a plurality of ring members disposed adjacent said cover means and defining a plurality of radial passages for the outflow of flesh paste and a frustro-conical surface disposed for contact with the bones to retain same within the chamber.

3. A press according to claim 2 wherein said covering means has a frustro-conical surface defining a portion of said passage which frustro-conical surface adjoins in smoothly merging relationship, the frustro-conical surface defined by said ring members.

4. A press according to claim 1 wherein said valve means includes a gate member moveable in slidable engagement with said cover means to selectively open and close said passage.

5. A press according to claim 1 wherein said plunger is fitted within said chamber for movement axially and with a peripheral clearance, and including means defining a passage through said chamber communicating with the peripheral clearance space between said plunger and chamber to accommodate the exit of flesh paste by flow through said peripheral clearance space.

* * * * *